United States Patent
Friderich et al.

(10) Patent No.: US 8,979,191 B2
(45) Date of Patent: Mar. 17, 2015

(54) VEHICLE SEAT COMPRISING A PAD OF A SEAT CUSHION AND/OR OF A BACKREST AND A MASSAGE DEVICE

(75) Inventors: Sven Friderich, Boeblingen (DE); Gerhard Hauser, Kusterdingen (DE); Werner Schiele, Kornwestheim (DE); Gudrun Weiser, Karlsruhe (DE); Ulrich Woerner, Weil der Stadt (DE)

(73) Assignee: Daimler AG, Stuttgart (DE)

( * ) Notice: Subject to any disclaimer, the term of this patent is extended or adjusted under 35 U.S.C. 154(b) by 649 days.

(21) Appl. No.: 13/148,678

(22) PCT Filed: Feb. 11, 2010

(86) PCT No.: PCT/EP2010/000847
§ 371 (c)(1),
(2), (4) Date: Oct. 4, 2011

(87) PCT Pub. No.: WO2010/091864
PCT Pub. Date: Aug. 19, 2010

(65) Prior Publication Data
US 2012/0032478 A1    Feb. 9, 2012

(30) Foreign Application Priority Data

Feb. 11, 2009   (DE) .......................... 10 2009 008 421
Jul. 1, 2009    (DE) .......................... 10 2009 031 333
Jul. 31, 2009   (DE) .......................... 10 2009 035 566

(51) Int. Cl.
*A47C 7/72*     (2006.01)
*B60N 2/44*     (2006.01)
*B60N 2/56*     (2006.01)

(52) U.S. Cl.
CPC .............. *B60N 2/448* (2013.01); *B60N 2/5685* (2013.01); *Y10S 297/03* (2013.01)

USPC ............. 297/180.11; 297/180.15; 297/DIG. 3

(58) Field of Classification Search
USPC ........... 297/180.11, 180.1–180.6, 217.4, 273, 297/270.4, 270.41, DIG. 3
See application file for complete search history.

(56) References Cited

U.S. PATENT DOCUMENTS 4,924,541 A * 5/1990 Inagaki ......................... 5/652.1
6,087,942 A   7/2000 Sleichter, III et al.
(Continued)

FOREIGN PATENT DOCUMENTS

DE   102 42 760 A1   3/2004
EP   1 987 853 A1    11/2008
(Continued)

OTHER PUBLICATIONS

Japanese-language Notification of Reasons for Refusal dated May 29, 2013 (Two (2) pages).

(Continued)

*Primary Examiner* — David R Dunn
*Assistant Examiner* — Alexander Harrison
(74) *Attorney, Agent, or Firm* — Crowell & Moring LLP

(57) ABSTRACT

A vehicle seat includes a pad of a seat cushion and/or of a backrest, a massage device having a plurality of pressurizable elements integrated into the pad in order to influence the contour of the seat and each of which can be controlled separately, and a control device for controlling the massage device, wherein, in addition to the massage device, a seat climate control system can also be controlled by the control device.

14 Claims, 2 Drawing Sheets

(56) References Cited

U.S. PATENT DOCUMENTS

| | | | |
|---|---|---|---|
| 6,682,494 B1* | 1/2004 | Sleichter, III et al. | 601/57 |
| 7,334,839 B1 | 2/2008 | Malerba | |
| 7,409,735 B2 | 8/2008 | Kramer et al. | |
| 7,600,817 B2* | 10/2009 | Kramer et al. | 297/362.13 |
| 8,167,367 B1* | 5/2012 | Martinez | 297/180.12 |
| 8,276,986 B2* | 10/2012 | Kim | 297/180.11 |
| 2005/0253425 A1* | 11/2005 | Asada et al. | 297/180.1 |
| 2006/0049678 A1 | 3/2006 | Kern et al. | |
| 2006/0085919 A1 | 4/2006 | Kramer et al. | |
| 2007/0158981 A1 | 7/2007 | Almasi et al. | |
| 2010/0001558 A1* | 1/2010 | Petrovski | 297/180.12 |
| 2010/0022926 A1* | 1/2010 | Kramer et al. | 601/148 |
| 2010/0130808 A1 | 5/2010 | Hattori | |
| 2013/0097777 A1* | 4/2013 | Marquette et al. | 5/423 |

FOREIGN PATENT DOCUMENTS

| | | |
|---|---|---|
| JP | 2001-112565 A | 4/2001 |
| JP | 2004-141475 A | 5/2004 |
| JP | 2006-514560 A | 5/2006 |
| JP | 2007-130481 A | 5/2007 |
| JP | 2007-283932 A | 11/2007 |
| JP | 2008-509793 A | 4/2008 |
| WO | WO 2004/026623 A1 | 4/2004 |

OTHER PUBLICATIONS

International Search Report with English translation dated Jun. 1, 2010 (six (6) pages).

Form PCT/ISA/220 (four (4) pages).

Form PCT/ISA/237 (six (6) pages).

English translation of Chinese Office Action dated Jan. 18, 2013 (Five (5) pages).

Chinese Office Action with English translation dated Aug. 23, 2013 (12 pages).

* cited by examiner

VEHICLE SEAT COMPRISING A PAD OF A SEAT CUSHION AND/OR OF A BACKREST AND A MASSAGE DEVICE

BACKGROUND AND SUMMARY OF THE INVENTION

Exemplary embodiments of the present invention relate to a vehicle seat comprising a pad of a seat cushion and/or of a backrest and a massage device.

Such a vehicle seat is for example known from the Mercedes-Benz S class (series W221). Seven massage chambers and four programs are thereby provided, which furnish a stimulation of the back musculature with a rolling movement.

German Patent Document No. DE 10242760 A1 discloses a further vehicle seat, where cushion-like elements are provided, which can be pressurized individually via a control unit. In this manner, a static contour of a seat is defined or can be adjusted on the one hand, and different massage functions can be realized by the application of elements on the other hand.

Exemplary embodiments of the present invention relate to a vehicle seat with which a larger relaxation effect or a comforting effect can be achieved.

In accordance with exemplary embodiments of the present invention, a vehicle seat comprises a pad of a seat cushion and/or of a backrest, which comprises a massage device with a plurality of pressurizable elements, which are integrated into the pad for influencing the contour of the seat and which respectively can be actuated separately, and with a control device for controlling the massage device, wherein a seat climate control can be controlled using the control device in addition to the massage device. The connection of the massage device to the seat climate control results in a higher relaxation effect for the occupant, as the heat or chill effect supports the massage effect and thereby intensifies the comfort of the occupant.

In an aspect of the present invention at least two seat heating zones of a seat heater can be controlled using the control device. Thereby, it is possible for the occupant to decide at any time via the control device, which seat heating zone or seat heating zones of the at least to zones of the seat heater shall be switched on.

In a further aspect of the invention, the individual pressurizable elements can be controlled in different sequences or massage programs by means of the control device. A specific massage function—for example in a back region or in the shoulder region—can thereby for example be realized in a simple and effective manner by means of a periodic change or combined actuation of individual pressurizable elements.

According to an aspect of the invention, the individual pressurizable elements are formed as cells of a massage mat, by which punctiform changes of the contour of the seat can essentially be achieved. When the individual elements or cells are integrated into a massage mat, the assembly of the massage device within the pad of the vehicle seat is eased on the one hand. On the other hand, the position of the individual elements is thereby also fixed in a precise manner, so that particularly a sliding of a displacement can also be avoided during the massage.

By means of the punctiform changes of the contour of the seat when pressurizing the individual elements, only a relatively small region of the pad is moved or of the contour of the seat is influenced by actuating a single element. The punctiform pressurization has the advantage that the manifold of the massage functions that can be realized by the seat is increased.

In an aspect of the invention the massage mat comprises at least 18 elements or cells for at least 14 massage zones. By dividing the pad into at least 14 zones for at least 18 elements, with at least one element provided in each zone, certain back zones can for example be massaged in a targeted manner.

In another aspect of the invention, at least four preset or individually settable massage programs are provided in the control. An implementation or personally preferred massage sequences or known massage types can in particular be realized hereby, as for example a reflex zone massage with a targeted massage of individual regions of the body.

The elements can be pressurized pneumatically or electro-pneumatically. Individual elements can thereby be actuated in a simple manner. The use of air compared to a fluid with regard to possible leakage problems is thereby advantageous.

The seat heater can be formed as a carbon or flex heater. Very flexible seat heaters are thus used, which adapt to the change of the contour of the seat during the massage. Particularly, carbon heaters are very resistant against mechanical stresses as for example bending, changing or tension loads.

It is also advantageous if the pressurizable elements are formed as massage elements for massaging a vehicle occupant and at least one functional element is provided, which comprises a heating and a cooling device. The functional element can hereby optionally be operated as a heating or as a cooling device. Thereby, two devices separate from each other do not have to be provided for the cooling or heating, but one and the same heating and cooling device can be used optionally for heating or for cooling. This simplifies the technical installation effort of the functional element, whereby the vehicle seat enables a cooling or heating in a simplified manner.

By means of the cooperation of heat, or particularly a chill acting for a short time, with the pressure provided by the massage element, a particularly comforting, relaxing effect can be achieved for the vehicle occupant. Analogously to a hot treatment (hot stone therapy) or cold stone treatment (cold stone therapy), the introduction of heat into deeper body zones of the vehicle occupant can lead to a state of deep relaxation and an increased well-being. The local chilling of the body of the vehicle occupant supports the blood circulation and the lymph flow in a comfortable manner. Typical heat application areas can hereby be back pain and/or muscle and joint pain. Typical chill applications can be present with headaches, sprains and/or muscle strains with inflammatory occurrence. A change from cold to warm can particularly act against chronic hardenings and/or tensions.

The switchover of the at least one functional element from the heating operation to the cooling operation and vice versa can take place in a particularly simple manner, if the at least one functional element is formed as a Peltier element. Such a Peltier element has a warm side due to applying an electrical voltage and a cold side. By reversal of the current direction, the warm side can then be use as a cold side and the cold side be used as a warm side. The switchover between cooling and heating can thus take place in a particularly quick manner.

The functional element can be arranged in a region of the vehicle seat pressurized by the at least one massage element. Thus, not only heat or chill can be provided locally, but the provision of chill or heat can be coupled locally to the pressure provided by the massage element and a cold or a warm pressure point can thus be provided optionally. A temporal coupling of pressure and heat or pressure and chill with alternating heat and chill can also be provided. Particularly, increasing or decreasing pressure can accompany increasing or decreasing heat or optionally chill. The increase and the decrease of the thermal effect and of the pressure can take place in the opposite direction, at least at times.

Because the heat or chill can be provided by the functional element that can optionally be operated as the heating device or as the cooling device, the entire vehicle seat does not have to be heated or chilled, whereby a high energy efficiency can be achieved. The heat or the chill can hereby particularly be provided only in the region of the massage elements.

The massage elements arranged in the rear partial region of the backrest are designed to pressurize ischium bumps, that is, the lower, thickened regions of the ischium of a vehicle occupant. If the massage elements are thus filled with a pneumatic or hydraulic medium, the ischium bumps are lifted.

Compared to this, the massage elements arranged in the lower partial region of the backrest are formed to pressurize the two ilia of the pelvis of the vehicle occupant with a pressure directed to the front.

BRIEF DESCRIPTION OF THE DRAWING FIGURES

Further advantages, characteristics and details of the invention result from the following description of a preferred embodiment and by means of the drawings.

DETAILED DESCRIPTION

Figure 1:
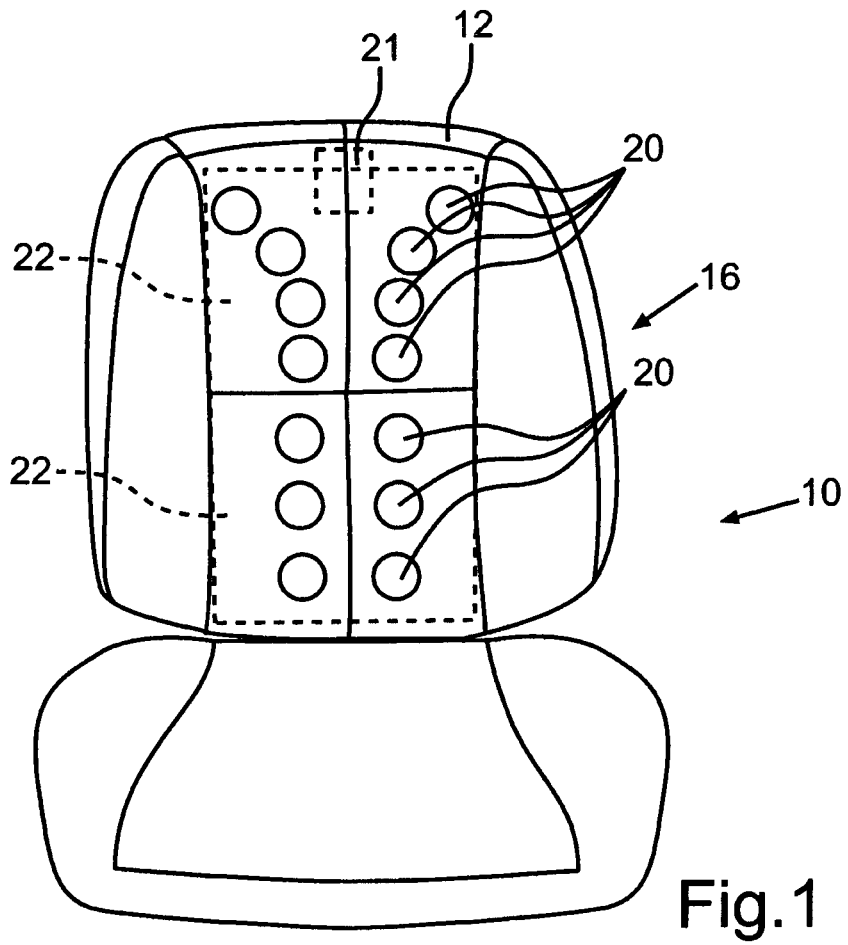
FIG. 1 illustrates a front view of a vehicle seat, which comprises a massage device and a seat heater, with a pad of a backrest, wherein massage zones of the massage device and two seat heating zones are formed on the pad of the seat backrest 14.

FIG. 1 shows a front view of a vehicle seat 10 with a pad 12 of a backrest 14. The seat backrest has a massage device and a seat heater. FIG. 1 schematically illustrates fourteen massage zones 20 of the massage device on the pad 12 of the backrest 16 and an upper and a lower seat heating zone 22 of the seat heater. The massage zones 20 and the seat heating zones 22 are in the interior of the pad 12.

It can be seen from FIG. 1 that the massage zones 20 are arranged to the left and the right of a vertical symmetry plane along the backrest 16 in such a manner that massages to the left and the right of the spine of an occupant are possible from the loin region to the shoulder region. Different sequences of the massage zones 20 or of the massage programs can be controlled by schematically illustrated control device 21.

In addition to the massage device, the seat heater of the backrest 16 can be controlled by the control device 21. The upper and the lower seat heating zone 22 can thereby be switched on independently or separately from each other and thus for example heat the upper or the lower back region of the occupant during a massage.

So that the contour of the seat can adapt to the variable contours of the massage device, the seat heater is formed as a carbon or flex heater, as these heater types are particularly flexible.

Figure 2:
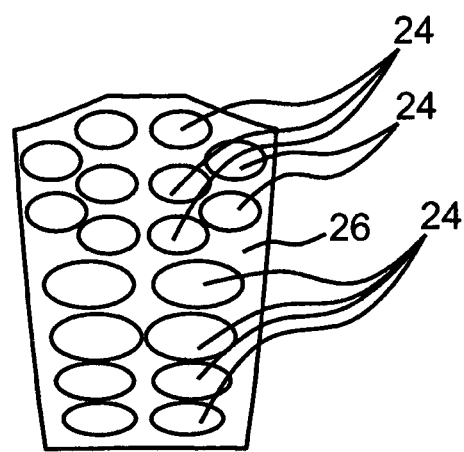
FIG. 2 illustrates a front view of a massage mat of the massage device, in which 18 pressurizable elements are formed as individual cells of the massage mat.

FIG. 2 illustrates a front view of a massage mat 26 of the massage device, which can be integrated into the pad 12 of the backrest 16. Eighteen pressurizable elements 24 are formed as individual cells in this massage mat 26.

The individual elements 24 or cells are thereby formed in an oval or circular manner respectively with lateral limiting edges, so that essentially only one extension in the direction vertically to the surface of the contour of the seat takes place when pressurizing the element 24. By pressurizing individual cells or elements 24, punctiform changes of the contour of the seat are thus achieved.

A sequence of pressurized elements 24 has a massage effect on an occupant of the vehicle by means of the punctiform change of the contour of the seat. Thus, a predefined massage function can, for example, be realized in a back region by periodic change or combined actuation of individual pressurizable elements 24. For example, a massage in the back loin region can take place with the lower elements 24 or a massage in the shoulder region can take place with the upper elements 24.

The elements 24 can be pressurized pneumatically or electro-pneumatically by individual lines, not shown in FIG. 2. The pressurization of the individual elements 24 or the sequence of elements 24 or massage programs can be actuated by the control device 21. Four or more massage programs, which can be preset by the manufacturer or individually set by the user, can thus be stored in the control device 21 and which can be switched on either on their own or in combination with one or two seat heating zones 22.

The number of elements 24 and massage zones 20 of the massage device can vary. The higher the number, and the smaller the elements 24, the more targeted the massage functions can be executed for certain body zones. The seat heater at the backrest 16 can also be divided into more than two seat heating zones 22, which can then be formed smaller than in this embodiment and thus also heat smaller body zones in a targeted manner.

The above-described pad 12 can correspondingly also be used for the seat cushion part of the vehicle seat 10. The pad 12 could additionally also be used with another seat system without single seats, for example a rear seat bench.

Figure 3:
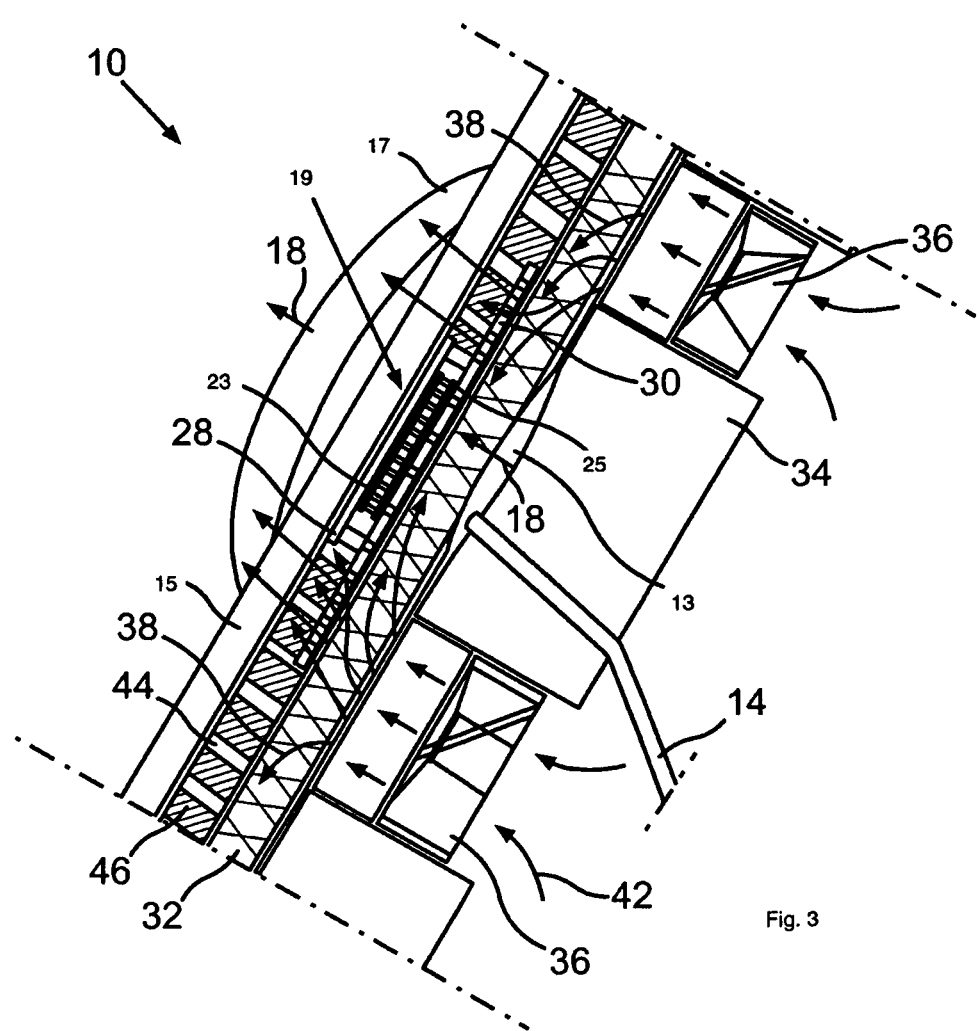
FIG. 3 illustrates a partial region of the vehicle seat with a massage element in a schematic sectional view.

The vehicle seat 10 shown in part in FIG. 3 has a plurality of hollow bodies 13 as massage elements, of which only one is shown in an exemplary manner in the figure. The hollow body 13 can be pressurized with a medium, particularly a pneumatic medium, via a line 14. When filling the hollow body 13 with the medium, for example with pressurized air, the hollow body 13 curves in the direction of a seat cover 15 of the vehicle seat 10. The corresponding deformation direction of the hollow body 13 is illustrated in the figure by a movement arrow 18.

The vehicle seats curves in a convex manner under the pressure of the filling hollow body 13 in a region, in which the hollow body 13 is arranged. A corresponding curvature 17 of the vehicle seat 10 is shown schematically in the figure. By means of this curvature 17 of the seat cover 15, a massage effect can be provided for the vehicle occupant on the vehicle seat 10. In cooperation of several of these hollow bodies 13, a plurality of massage programs can be realized.

A Peltier element 19 is arranged between the seat cover 15, particularly having a filling, and the hollow body 13. The pressure of the curving hollow body 13 thus transfers to the Peltier element 19 and via this to the seat cover 15. The Peltier element 19 comprises an upper part 23 near the seat cover 15 and a lower part 25 spaced further away from the seat cover 15. By applying the Peltier element 19 with electrical current, the upper part 23 or the lower part 25 can now optionally provide heat or chill. If the upper part 23 is cold, the lower part 25 is warm, and vice versa.

Thereby, the pressure acting on the body of the vehicle occupant via the hollow body can locally be combined with chill or optionally with heat, which is respectively provided by the upper part 23 of the Peltier element 19.

When filling the hollow body 13, the upper part 23 near the body of the vehicle occupant is thus moved in the direction of the of the body part of the vehicle occupant in abutment with the seat cover 15. This can particularly be the back of the vehicle occupant. The vehicle occupant thus perceives a massage effect acting in a comfortable manner, which is additionally supported by the chill or heat effect of the Peltier element 19 in the manner of a hot stone massage or hot stone therapy or in the manner of a cold stone massage or cold stone therapy. Such a hot stone or cold stone massage can be used with the aim of bodily and/or emotional relaxation of the vehicle occupant.

The Peltier element 19 is arranged between a covering plate 28 in abutment with the seat cover 15 and a cooling body 30 lying below the lower part 25. The covering plate 28 can hereby, as shown presently, be dimensioned larger than the upper part 23 of the Peltier element 19. If, as also illustrated in an exemplary manner, the cooling body is still dimensioned larger than the covering plate 28, a particularly large heat transfer surface is provided by the cooling body 30.

The cooling body 30 serves particularly for a discharge of heat from the lower part of the Peltier element 22, when chill is provided for the vehicle occupant through the upper part 23.

In order to further ease this discharge of heat via the cooling body 30, an air guide layer 32 can lie below the cooling body 30. The air guide layer 32 having the hollow spaces enables a convective discharge from the cooling body 30.

A force-convective discharge of the heat can presently be achieved by operating blowers 36 arranged in a foam support 34 of the vehicle seat. Corresponding flow arrows 38 illustrate the force-convected transport of the heat in the figure provided by the Peltier element 19.

The blowers 36 can, as shown in the figure in an exemplary manner, be formed as space-saving axial blowers, which are arranged in corresponding recesses 40 of the foam support 34 of the vehicle seat 10. Intake air 42 can reach the blowers 36 via an air inlet respectively formed in the foam support 34. The intake air 42 is illustrated in the figure by corresponding flow arrows.

The Peltier element 19, the cover plate 28 and the cooling body 30 are presently accommodated in the region of a comfort layer 46 of the vehicle seat 10 having air passages 44. The seat cover 15 abuts the comfort layer 46 at the upper side, the air guide layer 32 at the lower side.

In an alternative embodiment of the vehicle seat 10, the Peltier element 19 can provide the desired heat or chill in a region of the vehicle seat 10, which is not pressurized by means of the hollow body 13. In this case, the air guide layer 32 and/or a heat-conductive material layer can provide the transport of the heat or the chill to the curvature 17. At least one blower 36 can hereby act in a supporting manner particularly in the case of providing the air guide layer 32.

The hollow body 13 acting at least as a massage element massage element and providing the curvature 17 is preferably arranged in a region of the vehicle seat 10, which is, when using the vehicle seat 10 by the vehicle occupant, in abutment with his spine. The positioning of the hollow body 13 and particularly of the Peltier element 19 in these locations of the body, possibly localized by physiotherapeutic knowledge, can result in a particularly high relaxation effect. The hollow bodies 13 and the respective Peltier elements 19 can hereby particularly be arranged in the region of energy centers arranged at the spine of the vehicle occupant.

Hereby, particularly for vehicle occupants having different body sizes, respectively different massage elements and Peltier elements 19 can be used in the vehicle seat 10 specifically to the body size.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle seat comprising:
a seat cover, which covers the vehicle seat;
a pad of a seat cushion or of a backrest;
a massage device having a plurality of individually controlled pressurizable elements integrated into the pad in order to influence the contour of the seat;
a seat climate control system, which comprises a plurality of functional elements configured to heat and cool, wherein each of the plurality of functional elements is arranged between the seat cover and one of the plurality of individually controlled pressurizable elements in such a manner that heating and cooling is only provided in regions of each of the plurality of individually controlled pressurizable elements so that heating or cooling is coupled locally to pressure provided each of the plurality of individually controlled pressurizable elements to produce hot or cold pressure points;
a control device that controls the massage device and the seat climate control system.

2. The vehicle seat according to claim 1, wherein at least two seat heating zones of the seat climate control system are controllable by the control device.

3. The vehicle seat according to claim 1, wherein the individually controlled pressurizable elements are controllable by the control device in different sequences or massage programs.

4. The vehicle seat according to claim 1, wherein the individual controlled pressurizable elements are cells of a massage mat, which achieves essentially punctiform changes of the contour of the seat.

5. The vehicle seat according to claim 4, wherein the massage mat comprises at least 18 elements or cells for at least 14 massage zones.

6. The vehicle seat according to claim 1, wherein at least four preset or individually settable massage programs are provided in the control device.

7. The vehicle seat according to claim 1, wherein the individually controlled pressurizable elements are pneumatically or electro-pneumatically pressurizable.

8. The vehicle seat according to claim 2, wherein the plurality of functional elements are carbon or a flex heaters.

9. The vehicle seat according to claim 1, wherein the individually controlled pressurizable elements are arranged at least partially in a region of the vehicle seat, which is in superposition with a spine of a vehicle occupant seated in the vehicle seat.

10. The vehicle seat according to claim 2, wherein the plurality of functional elements are arranged at least partially in a region of the vehicle seat, which is in superposition with a spine of a vehicle occupant seated in the vehicle seat.

11. The vehicle seat according to claim 1, wherein the pressurizable elements are massage elements that massage a seat occupant.

12. The vehicle seat according to claim 1, wherein the functional element is a Peltier element.

13. The vehicle seat according to claim 11, wherein a first massage element pressurizes at least one ischium of the seat occupant with a standard seat position of the seat occupant, in which a pelvis of the seat occupant is in abutment with a lower partial region of the pad.

14. The vehicle seat according to claim 11, wherein at least one second massage pressurizes at least one ischium of the seat occupant with a standard seat position of the seat occupant, in which a pelvis of the seat occupant is in abutment with a lower partial region of the pad.

* * * * *